United States Patent [19]
Masaki

[11] Patent Number: 5,629,792
[45] Date of Patent: May 13, 1997

[54] EXTERNAL MODULATOR AND METHOD FOR EXTERNALLY MODULATING LIGHT

[75] Inventor: Katsumi Masaki, Tokyo, Japan

[73] Assignee: Kabushiki Kaisha Toshiba, Kawasaki, Japan

[21] Appl. No.: 521,655

[22] Filed: Aug. 31, 1995

[30] Foreign Application Priority Data

Sep. 7, 1994 [JP] Japan ................................ 6-213830

[51] Int. Cl.$^6$ .................................................. G02F 1/03
[52] U.S. Cl. .......................... 359/245; 359/276; 359/187
[58] Field of Search ................................ 359/245, 276, 359/181, 187; 372/38

[56] References Cited

U.S. PATENT DOCUMENTS

5,003,624   3/1991   Terbrack et al. ...................... 455/618

Primary Examiner—Mark Hellner
Attorney, Agent, or Firm—Oblon, Spivak, McClelland, Maier & Neustadt, P.C.

[57] ABSTRACT

A main signal is amplitude-modulated by a predetermined low frequency signal generated by a low frequency signal generator, and a bias voltage generated by a bias voltage applying circuit of an initial bias setting circuit is superimposed thereon by an adder to generate a modulation signal. An external modulating device is driven by the modulation signal to generate an optical signal. The optical signal generated by the external modulating device is branched by an light branching device, and converted to an electrical signal by a light-electricity converting device, and a component corresponding to the low frequency signal is extracted by a filter. A multiplier detects the extracted low frequency signal by use of the low frequency signal generated by the low frequency signal generator. A voltage level of the bias voltage is changed based on a difference between a level of an obtained detection signal and a predetermined reference voltage. At the time of starting a power supply, the bias voltage is controlled to a predetermined voltage level (for example, ground level) by an integrating circuit comprising a capacitor and a resistor.

12 Claims, 6 Drawing Sheets

EXTERNAL MODULATOR AND METHOD FOR EXTERNALLY MODULATING LIGHT

BACKGROUND OF THE INVENTION

1. Field of the Invention

The present invention relates to an external modulator using an external modulating device of an interference type and a method for externally modulating light.

2. Description of the Related Art

An external modulating device of an interference type is used to change intensity of input light in accordance with a level of a modulation signal (electrical signal). Therefore, an optical signal can be generated by the external modulating device.

The above modulation signal is formed by superimposing a DC voltage (hereinafter called as bias voltage) on a main signal having data to be transmitted by the optical signal. The external modulating device has a characteristic in which an operation point is changed in accordance with the level of the bias voltage to be applied. Then, the bias voltage superimposed on the modulation signal is arbitrarily adjusted, so that the operation point can be arbitrarily adjusted.

However, the external modulating device has a characteristic in which the operation point is varied in accordance with a change of temperature even if the bias voltage is set to be constant. Due to this, it is necessary to adjust the operation point to an operation stable point in which such a variation of the operation point is compensated and a suitable modulation can be performed. For that object, under a condition that the bias voltage is variable the bias voltage is adjusted by, for example, a lock-in amplifier such that the operation point always becomes the operation stable point.

The external modulating device also has a characteristic in which the change of intensity of an output light, is caused in accordance with increase in the bias voltage, becomes a periodic function. More specifically, for example, the relationship between intensity of output light of the external modulating device and the bias voltage can be shown as in FIG. 1.

Moreover, the external modulating device has a characteristic in which a DC drift is provided. The DC drift is a phenomenon in which the level of the bias voltage, which is necessary for obtaining a certain intensity of output light, is changed with the passage of time. More specifically, if the relationship between intensity of output light in its initial state and the bias voltage is in a state as shown by a solid line of FIG. 1, the relationship therebetween is changed to a state as shown by a broken line of FIG. 1 after a certain period time is passed. Thereby, in a case where the bias voltage, which can obtain the maximum intensity of output light in its initial state, is Va, the bias voltage, which can obtain the same intensity of output light after a certain period of time is passed, is changed to Vb. Therefore, the bias voltage for adjusting the operation point to the operation stable point, is changed even by the DC drift. However, by providing the above-mentioned adjustment of the bias voltage, influence of the DC drift can be compensated and the operation point can be adjusted to the operation stable point.

However, unlike the variation of the operation point, which is caused by the change of temperature, in the DC drift, there is a tendency that the bias voltage is increased in a direction of a positive voltage if the bias voltage is positive (one direction). In other words, if a difference between the bias voltage, which can obtain certain intensity of output light in its initial state, and the bias voltage, which can obtain certain intensity of output light after a certain period of time is passed, is set to an amount of drift (for example, Va–Vb of FIG. 1), the relationship between passing time from the initial state and the amount of drift can be shown in FIG. 2. The larger the bias voltage becomes, the larger the amount of drift for a fixed period of time becomes.

Then, in order to compensate for influence of the DC drift, the bias voltage must be continued to be increased or decreased. However, it is difficult to change the bias voltage limitlessly, and the variable range of the bias voltage is limited by a power supply voltage. Due to this, if the bias voltage changes to the limit of the variable range, the controlling is saturated. Then, the following compensation for influence of the DC drift cannot performed, and the life of an apparatus using the external modulating device is completed in the point of the continuous operation.

Figure 1:
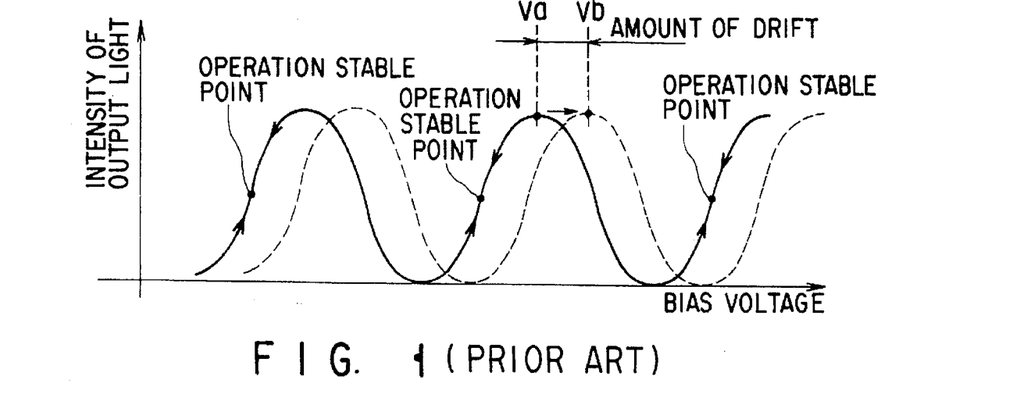
FIG. 1 is a view showing a relationship between intensity of output light and a bias voltage in an external modulating device.
Figure 2:
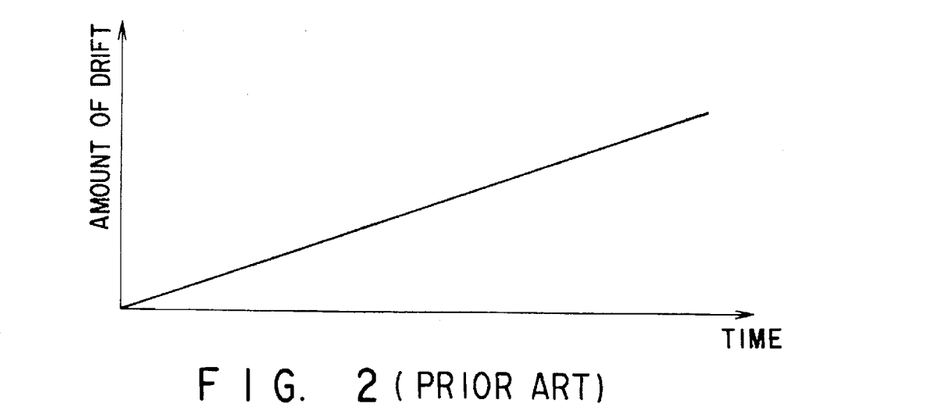
FIG. 2 is a view showing a relationship between passing time from an initial state and an amount of drift.
Figure 3:
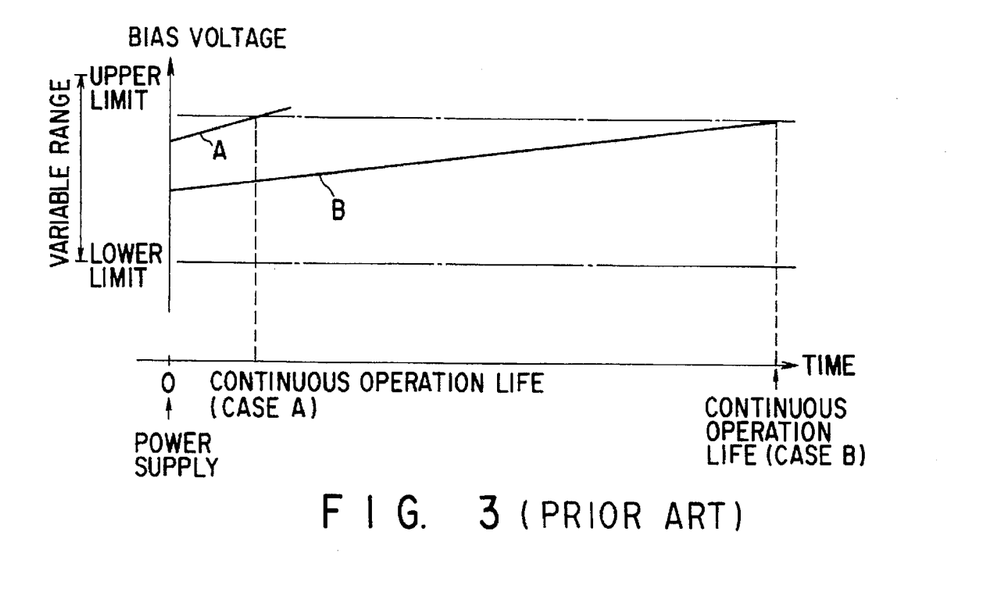
FIG. 3 is a view showing a relationship between an initial setting value of the bias voltage and a life of an continuous operation.

In the external modulating device, the change of intensity of output light, is caused in accordance with increase in the bias voltage, becomes the periodic function as shown in FIG. 1, there exists a plurality of operation stable points as shown in FIG. 1. Then, in the initial state after power supply, it is not fixed to which operation stable point the operation point is adjusted. Due to this, in the initial state after power supply, if the operation is stabilized at an operation stable point, which is achieved by the bias voltage close to an upper or lower limit of the variable range, the bias voltage is set to be in the vicinity of the upper or lower limit of the variable range. Due to this, a dynamic range of control becomes narrow, and time till the controlling is saturated (life of continuous operation) becomes short. More specifically, for example, as shown in FIG. 3, in a case A in which the bias voltage is set to be close to the upper limit of the variable range at the time of power supply, the life of the continuous operation becomes considerably short as compared with a case B in which the bias voltage is set to be close to the center of the variable range.

SUMMARY OF THE INVENTION

The present invention has been made in consideration of the above-mentioned problem. An object of the present invention is to provide an external modulator, which can externally modulate light for a long period of time stably, and a method for externally modulating light.

The above object can be realized by an external modulator comprising an external modulating device of an interference type; low frequency signal generating means for generating a predetermined low frequency signal; bias generating means for generating a bias voltage; superimposing means for amplitude-modulating a main signal by the low frequency signal, and superimposing the bias signal thereon to obtain a signal serving as a modulation signal to be supplied to the external modulating device of the interference type; low frequency signal extracting means for extracting a component corresponding to the low frequency signal from an output light of the external modulating device of the interference type; bias controlling means for controlling a voltage level of the bias voltage based on the low frequency signal extracted by the low frequency signal extracting means; and initial setting means for controlling the bias voltage to be a predetermined voltage level at the time of starting a power supply.

Also, the above object can be realized by an external modulator comprising an external modulating device of an interference type; low frequency signal generating means for generating a predetermined low frequency signal; bias generating means for generating a bias voltage; superimposing means for amplitude-modulating a main signal by the low frequency signal, and superimposing the bias signal thereon to obtain a signal serving as a modulation signal to be supplied to the external modulating device of the interference type; low frequency signal extracting means for extracting a component corresponding to the low frequency signal from an output light of the external modulating device of the interference type; bias controlling means for controlling a voltage level of the bias voltage based on the low frequency signal extracted by the low frequency signal extracting means; initial setting means for controlling the bias voltage to be a predetermined voltage level; discriminating means for discriminating whether or not the bias voltage is in a predetermined allowable range; and initial setting controlling means for fixing the bias voltage to a predetermined voltage level for a predetermined period of time when it is discriminated that the bias voltage is not in the predetermined allowable range by the discrimination means for the predetermined period of time after the power supply is started.

Moreover, the above object can be realized by a method for externally modulating light using an external modulating device of an interference type, comprising the steps of generating a predetermined low frequency signal; generating a bias voltage; amplitude-modulating a main signal by the low frequency signal, and superimposing the bias signal thereon to obtain a signal serving as a modulation signal to be supplied to the external modulating device of the interference type; extracting a component corresponding to the low frequency signal from an output light of the external modulating device of the interference type; controlling a voltage level of the bias voltage based on the low frequency signal extracted in the extracting step; and controlling the bias voltage to be a predetermined voltage level at the time of starting a power supply.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS (First Embodiment)

A first embodiment of the present invention will be explained with reference to the drawings.

Figure 4:
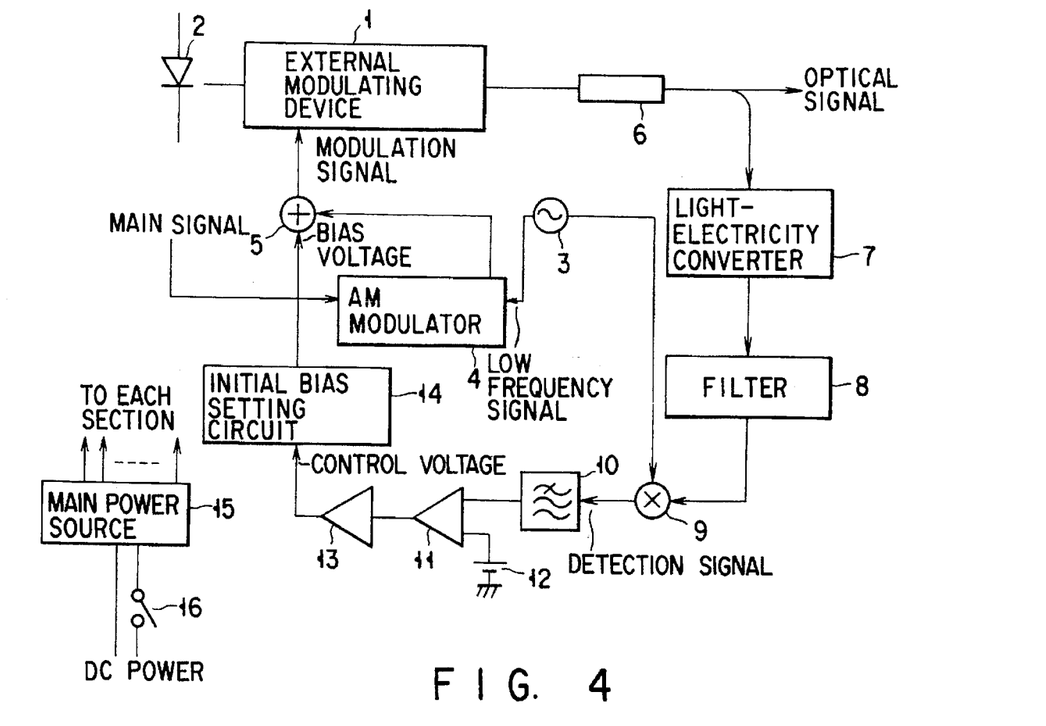
FIG. 4 is a view showing a schematic structure of an external modulator of a first to third embodiments of the present invention.

FIG. 4 is a view showing the structure of an external modulator of the embodiment of the present invention. As shown in FIG. 4, the external modulator of this embodiment comprises an external modulating device 1, a light source 2, a low frequency signal generator 3, an AM modulator 4, an adder 5, a light branching device 6, a light-electricity converter 7, a filter 8, a multiplier 9, a low-pass filter 10, a comparator 11, a reference voltage source 12, an error amplifier 13, an initial bias setting circuit 14, a main power source 15, and a power source switch 16.

The external modulating device 1 is an interfering type such as an LN modulating device, which is formed of LiNbO$_3$. The external modulating device 1 intensity-modulates light emitted from the light source 2 based on a modulation signal supplied from the adder 5.

The light source 2 is formed of, for example, a laser diode, and generates light having fixed intensity. The light source 2 supplies generated light to the external modulating device 1.

The low frequency signal generator 3 is, for example, a crystal oscillator. The low frequency signal generator 3 generates a low frequency signal having a predetermined frequency, and supplies the signal to the AM modulator 4 and the multiplier 9, respectively.

In addition to the low frequency signal generated by the low frequency signal generator 3, a main signal showing data to be transmitted by an optical signal is supplied to the AM modulator 4. The AM modulator 4 amplitude-modulates the main signal by the low frequency signal generated by the low frequency signal generator 3. The AM modulator 4 supplies the signal obtained by the amplitude-modulation to the adder 5.

In addition to the signal supplied from the AM modulator 4, a bias voltage, which is generated by the initial bias setting circuit 14, is supplied to the adder 5. The adder 5 superimposes the bias voltage, which is supplied from the initial bias setting circuit 14, on the signal supplied from the AM modulator 4 to generate a modulation signal. The adder 5 supplies the generated modulation signal to the external modulating device 1.

The light branching device 6 branches a part of output light of the external modulating device 1 to be supplied to the light-electricity converter 7.

The light-electricity converter 7 is, for example, a photodiode. The light-electricity converter 7 converts the optical light supplied from the light branching device 6 to an electrical signal to be supplied to the filter 8.

The filter 8 is formed of a bandpass filter or a low-pass filter. The filter 8 extracts a low frequency signal from the electrical signal supplied from the light-electricity converter 7, and supplies the signal to the multiplier 9.

The multiplier 9 multiplies the low frequency signal, which is supplied from the filter 8, by the low frequency signal, which is supplied from the low frequency signal generator 3, thereby detecting the low frequency signal supplied from the filter 8. The multiplier 9 supplies a detection signal obtained by the detection to the low-pass filter 10.

The low-pass filter 10 is formed of, for example, a CR circuit. The low-pass filter 10 removes a high frequency component from the detection signal sent from the multiplier 9, and supplies the detection signal to the comparator 11.

The comparator 11 compares a level of the detection signal supplied from the low-pass filter 10 with a reference signal generated by the reference power source 12, and supplies a signal, which has a voltage level corresponding to a difference between the detection signal and the reference signal, to the error amplifier 13.

The error amplifier 13 amplifies the signal supplied from the comparator 11, and generates a control voltage of the initial bias setting circuit 14. Then, the error amplifier 13 supplies the generated control signal to the initial bias setting circuit 14.

The bias setting circuit 14 generates a bias voltage having a level in accordance with the level of the control signal supplied from the error amplifier 13. Then, the bias setting circuit 14 supplies the generated bias voltage to the adder 5.

The main power source 15 is provided in, for example, an optical communication device to which the external modulator of this embodiment is applied. The main power source 15 generates power from DC power supplied from through a power line (not shown), and supplies the power to each section of the external modulator and other necessary portions.

The power switch 16 turns on/off the supply of DC power to the main power source in order to be on/off of the power supply to each section of the external modulator and the other necessary portions.

Figures 5, 6:
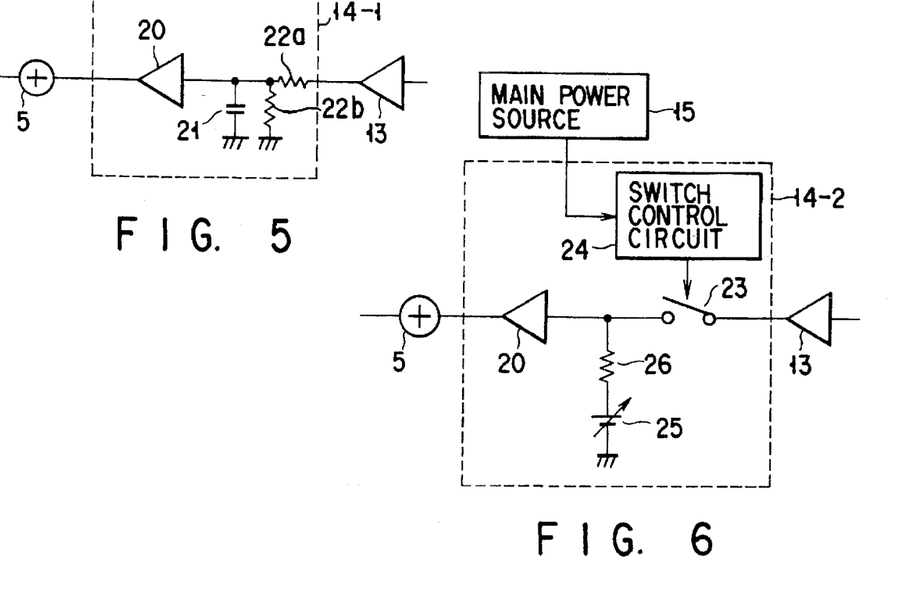
FIG. 5 is a view showing a specific structure of an initial bias setting circuit in the external modulator of the first embodiment of the present invention.
FIG. 6 is a view showing a specific structure of an initial bias setting circuit in the external modulator of the second embodiment of the present invention.

The initial bias setting circuit 14 (hereinafter called 14-1) comprises a bias voltage applying circuit 20, a charging capacitor 21, and resistors 22a, 22b as shown in FIG. 5.

The bias voltage applying circuit 20 generates a bias voltage to be supplied to the adder 5. The bias voltage applying circuit 20 increases or decreases the bias voltage in accordance with the level of the control voltage supplied from the error amplifier 13. In this case, the bias voltage can be changed in both positive and negative directions in a state that a ground level is set as a center. Also, the variable range of the bias voltage is substantially the same in both positive and negative directions.

The resistor 22a is connected between an output terminal of the error amplifier 13 and an input terminal of the bias voltage applying circuit 20 in series. Also, the charging capacitor 21 and the resistor 22b are provided between the input terminal of the bias voltage applying circuit 20 and the ground. Then, these charging capacitor 21 and the resistors 22a and 22b constitute an integrating circuit.

The following will explain an operation of the above-structured external modulator.

In the external modulating device 1, light emitted from the light source 2 is intensity-modulated based on a modulation signal. The modulation signal can be obtained by superimposing the signal, which is obtained by amplitude-modulating the main signal by the low frequency signal generated by the low frequency signal generator 3 in the AM modulator 4, on the bias voltage generated by the initial bias setting circuit 14-1 in the adder 5.

An output light of the external modulating device 1 is outputted as an optical signal through the light branching device 6. In this case, the part of the output light is branched by the light branching device 6 to be inputted to the light-electricity converter 7. The optical signal branched by the light branching device 6 is converted to an electrical signal by the light-electricity converter 7, and the low frequency signal is extracted by the filter 8. Then, the extracted low frequency signal and the low frequency signal, which the low frequency signal generator 3 generates, are multiplied by the multiplier 9 to be detected, thereby obtaining a detection signal.

The detection signal obtained by the multiplier 9 is passed through the low-pass filter 10, and compared with the reference signal, which is generated by the reference voltage source 12, by the comparator 11. By the comparator 11, the signal having a voltage level corresponding to a difference between the level of the detection signal and the reference signal can be obtained. Then, the obtained signal is amplified by the error amplifier 13 to generate the control voltage. By the initial bias setting circuit 14-1, the bias voltage, which is outputted by the bias voltage applying circuit 20, is increased or decreased in accordance with the level of the control voltage supplied from the error amplifier 13, so that the operation point is controlled.

The above explained the operation of the intensity-modulation of the optical light in the external modulating device 1 in a normal operating state, and the control operation of the bias voltage.

The following will explain an operation till the above-explained normal operating state can be obtained at the time of power supply.

First, when the power switch 16 is turned on, the DC power is supplied to the main power source 15. Thereby, the main power source 15 starts to supply power to each section of the external modulator to start each section.

At the time of starting the power supply, the error amplifier 13 does not output the control signal, and the input terminal of the bias voltage applying circuit 20 is set in a ground level by the bias setting circuit 14-1. Due to this, in the bias voltage applying circuit 20, the bias voltage is set to be the ground level in the initial state after the power supply. Then, the signal obtained by the AM modulator 4 is directly supplied to the external modulating device 1 as a modulation signal from the adder 5.

As mentioned above, the external modulating device 1 is started to be operated from the state having no bias voltage after the power supply is started. Under this state, if the operation of the external modulating device 1 is started and the output of the optical signal is started, the light-electricity converter 7, the filter 8, the multiplier 9, the low-pass filter 10, the comparator 11, the reference voltage source 12, and the error amplifier 13 are operated in the same manner as the above-mentioned operation state. Thereby, the control voltage is outputted from the error amplifier 13.

When the control voltage is outputted from the error amplifier 13, the charging capacitor 21 is charged by the control voltage. At the same time, the potential of the input end of the bias voltage applying circuit 20 is increased. Then, if the charging capacitor 21 is sufficiently charged after a certain period of time, the potential of the input terminal of the bias voltage applying circuit 20 is conformed to the control voltage, and the above-mentioned operation state can be obtained.

As mentioned above, the bias voltage is increased or decreased in a state that the ground level is set as a reference at the time of the power supply. Thereby, the operation of the external modulating device 1 is first stabilized at the operation stable point (thereinafter called "optimum stable point"), which is achieved by the bias voltage, which is close to the ground level among the plurality of operation stable points. In other words, when the operation of the external modulating device 1 is first stabilized after the power supply, the bias voltage is set to be in the vicinity of the ground level, which is the center of the variable range. Therefore, the dynamic range of control can be widely reserved, and the continuous operation time can be increased.

(Second embodiment)

In many cases, the optimum stable point can be achieved by the bias voltage other than the ground level. Due to this, in the case of the structure of the first embodiment, it is needed that the bias voltage be changed from the ground level to the level in which the optimum stable point can be achieved. In this case, time required for controlling the bias voltage, that is, a control speed is determined by the capacity of the charging capacitor 21. Due to this, there is a case that time till the external modulating device is stabilized at the operation stable point is largely increased.

The following will explain an embodiment for shortening time, which is needed till the external modulating device is stabilized at the operation stable point.

The external modulator of this embodiment has basically the same structure as that of the first embodiment. However, the external modulator of the second embodiment is different from the that of the first embodiment in the structure of the initial setting circuit 14.

FIG. 6 is a view showing the structure the initial bias setting circuit 14 (hereinafter called as 14-2) of this embodiment. In this case, the same reference numerals are added to the portions common to FIG. 4, and the detailed explanation will be omitted.

As shown in the figure, the initial bias setting circuit 14-2 comprises the bias voltage applying circuit 20, a switch 23, a switch control circuit 24, an initial bias setting voltage source 25, and a resistor 26.

The switch 23 is opened and closed under control of the switch control circuit 24 to turn on/off the input of the control voltage, which is outputted from the error amplifier 13, to the bias voltage applying circuit 20.

The switch control circuit 24 comprises a microprocessor as a main control circuit. The switch control circuit 24 operates on receipt of the power supply from the main power source 15. The switch control circuit 24 turns off the switch 23 for a fixed period of time when the power supply from the main power source 15 is changed from an OFF state to an ON state, and the power supply is started.

The initial bias setting voltage source 25 is connected between the bias voltage applying circuit 20 and the ground through the resistor 26. When the switch 23 is in an OFF state, the initial bias setting voltage source 25 applies a predetermined initial bias setting voltage to an input terminal of the bias voltage applying circuit 20. For example, the initial bias setting voltage is set at the level corresponding to the bias voltage by which the operation point can be controlled at the optimum stable point in case that the external modulator of this embodiment is in a predetermined standard state (for example, under a predetermined standard temperature and a state that no change with the passage of time occurs in the operation characteristic).

An operation of the above-structured external modulator will be explained as follows.

First, when the power switch 16 is turned on, the DC power is supplied to the main power source 15. Thereby, the main power source 15 starts the power supply to each section of the external modulator to be started.

Figure 7:
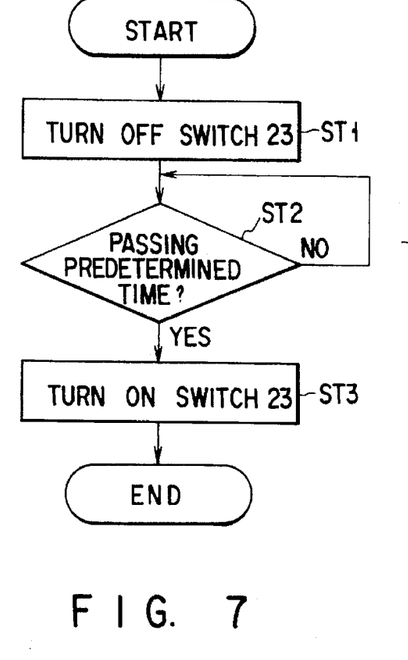
FIG. 7 is a flow chart showing steps of setting the initial bias in the external modulator of the second embodiment of the present invention.

When the power supply from the main power source 15 is started, the switch control circuit 24 performs the processing in accordance with the steps shown in FIG. 7. First of all, the switch control circuit 24 turns off the switch 23 (step ST1). As a result, the supply of the control voltage, which is outputted to the bias voltage applying circuit 20 from the error amplifier 13, is interrupted. Then, the initial bias setting voltage, which is generated by the initial bias setting voltage source 25, is supplied to the bias voltage applying circuit 20 through the resistor 26. Thereby, from the bias voltage applying circuit 20, there is outputted the bias voltage by which the operation point is controlled to be the optimum stable point in the state that the external modulator of this embodiment is in a standard state. Therefore, since the external modulator is in a standard state, the operation point is controlled to be the optimum stable point at this time.

After turning off the switch 23 in step ST1, the switch control circuit 24 is on standby for a predetermined period of time until the above-mentioned operation in which the initial bias setting voltage generated by the initial bias setting voltage source 25 is used as a control voltage is stabilized (step ST2). Then, if the predetermined period of time is passed, the switch control circuit 24 turns on the switch 23 (step ST3).

Then, the control voltage outputted from the error amplifier 13 is supplied to the bias voltage applying circuit 20. Thereby, the bias voltage is outputted to the bias voltage applying circuit 20 in accordance with the control voltage outputted from the error amplifier 13, and the following operation state is the same as the operation state of the first embodiment.

If drift is generated in the operation characteristic of the external modulating device 1 by the change of temperature and the change with the passage of time, the operation point is shifted from the optimum stable point by use of the bias voltage in accordance with the initial bias setting voltage generated by the initial bias setting voltage source 25. However, in this case, as mentioned above, if the switch 23 is turned on by the switch control circuit 24 and the control voltage outputted by the error amplifier 13 is supplied to the bias voltage applying circuit 20, the bias voltage is controlled to compensate for the above shift. At this time, the amount of change of the bias voltage corresponds to the amount of drift to be minimized.

According to the above embodiment, similar to the first embodiment, the operation of the external modulating device 1 is first stabilized at the optimum stable point after the power supply is started, and the continuous operation time is prolonged.

Moreover, according to the above embodiment, unlike the first embodiment in which the bias voltage is controlled from the ground level, the external modulating device is started by the level in which the operation point can be controlled to be the optimum stable point in the predetermined standard state. Also, the bias voltage can be changed by the amount corresponding to the variation of the optimum stable point generated by the state displacement from the predetermined state. Due to this, the amount of change of the bias voltage can be reduced at the time of starting the power supply, and the operation point can be speedily controlled to the optimum stable point.

(Third embodiment)

The following will explain a third embodiment of the present invention.

The external modulator of this embodiment has basically the same structure as that of the first embodiment and the second embodiment. However, the external modulator of the second embodiment is different from the that of the first embodiment and the second embodiment in the structure of the initial setting circuit 14.

Figure 8:
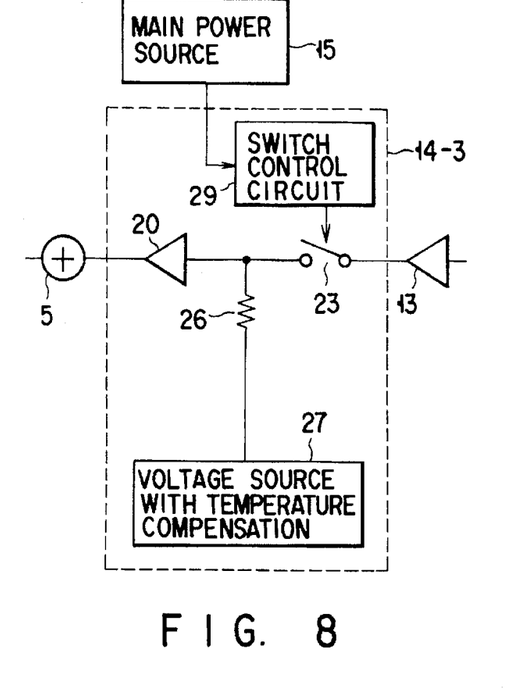
FIG. 8 is a view showing a specific structure of an initial bias setting circuit in the external modulator of the third embodiment of the present invention.

FIG. 8 is a view showing the structure of the initial bias setting circuit (hereinafter called 14-3) of the external modulator of this embodiment. In this case, the same reference numerals are added to the portions common to FIGS. 4 and 6, and the detailed explanation will be omitted.

The initial bias setting circuit 14-3 of this embodiment comprises the bias voltage applying circuit 20, the switch 23, the resistor 26, a voltage source 27 with temperature compensation, and a switch control circuit 29.

The voltage source 27 with temperature compensation generates the initial bias setting voltage corresponding to the bias voltage, which can control the operation point to the optimum stable point in consideration of the shift of the optimum stable point caused by the change of temperature.

The switch control circuit 29 comprises a microprocessor serving as a main control circuit. The switch control circuit 29 operates on receipt of the power supply from the main power source 15. When the power supply from the main power source 15 is changed from an OFF state to an ON state, the switch control circuit 29 turns off the switch 23 for a fixed period of time.

Figure 9:
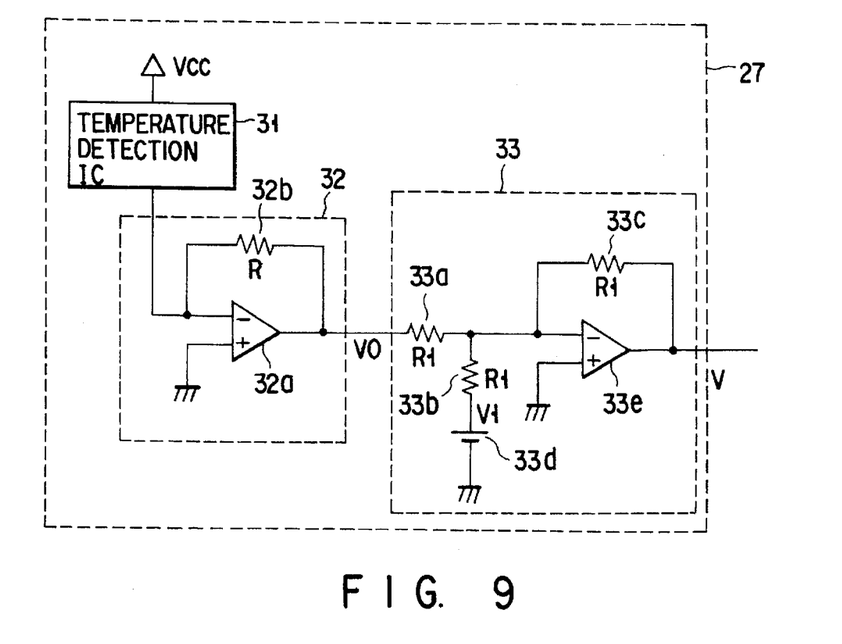
FIG. 9 is a circuit diagram showing a specific structure of a voltage source with a temperature compensation in the external modulator of the third embodiment of the present invention.

FIG. 9 is a circuit diagram showing the detailed structure of the voltage source 27 with temperature compensation.

The voltage source 27 with temperature compensation comprises a temperature detection IC 31, a current-voltage converting circuit 32, and an offset adjusting circuit 33.

The temperature detection IC 31 is a temperature detection IC which is put on the market and widely used to generate a current having a level in response to an ambient temperature. The temperature detection IC 31 is provided to detect the temperature of the external modulation device 1.

The current-voltage converting circuit 32 comprises an operational amplifier 32a and a resistor 32b. The current-voltage converting circuit 32 converts the current outputted from the temperature detection IC 31 to a voltage having a level corresponding to the current, and supplies the converted voltage to the offset adjusting circuit 33.

The offset adjusting circuit 33 comprises resistors 33a, 33b, 33c, an offset setting voltage power source 33d, and an operational amplifier 33e. The offset adjusting circuit 33 adjusts the offset of the voltage applied from the current-voltage converting circuit 33, thereby the initial bias setting voltage is generated.

An operation of the above-structured external modulator will be explained.

First, when the power switch 16 is turned on, the DC power is supplied to the main power source 15. Thereby, the main power source 15 starts the power supply to each section of the external modulator to start each section.

Figure 10:
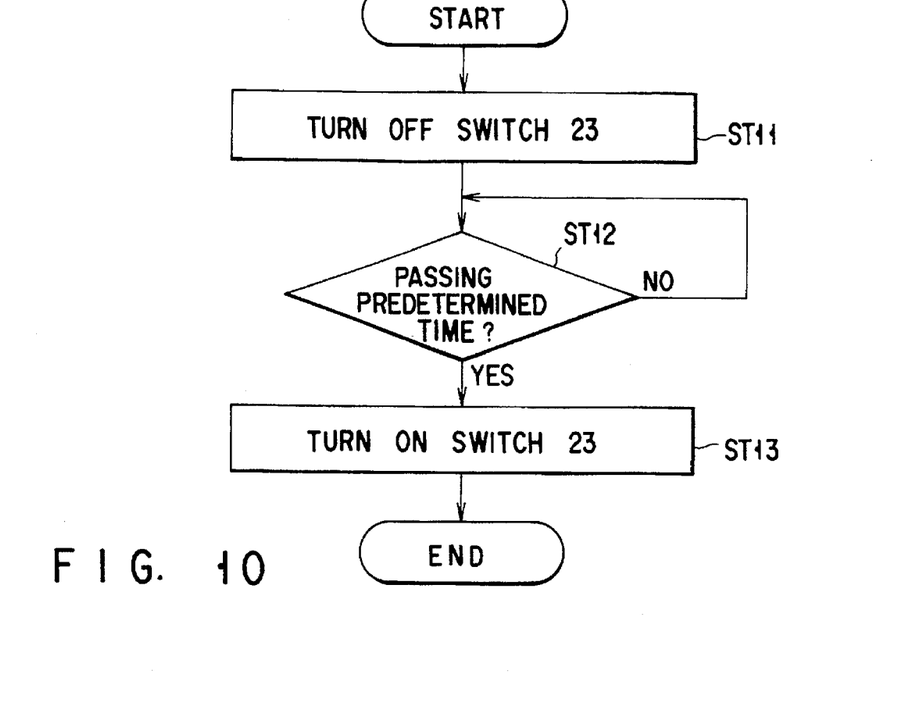
FIG. 10 is a flow chart showing steps of setting the initial bias in the external modulator of the third embodiment of the present invention.

When the power supply from the main power supply 15 is started, the switch control circuit 29 performs the steps shown in FIG. 10. More specifically, the switch control circuit 29 turns off (step ST11). As a result, the supply of the control voltage, which is outputted to the error amplifier 13 to the bias voltage applying circuit 20, is interrupted. Then, the initial bias setting voltage, which is generated by the voltage source 27 with temperature compensation, is supplied to the bias voltage applying circuit 20 through the resistor 26.

In the voltage source 27 with temperature compensation, the temperature detection IC 31 detects the temperature of the external modulating device 1, and the current whose level corresponds to the detected temperature is outputted. The output of the temperature detection IC 31 can be expressed by the following formula if temperature is T:

$$AT+B$$

wherein A is a proportional constant, and B is an offset current value.

The current generated by the voltage source 27 with temperature compensation is supplied to the current-voltage converting circuit 32. Then, the current is converted to the corresponding level by the current-voltage converting circuit 32. Level $V_0$ of the voltage obtained by the current-voltage converting circuit 32 can be expressed by the following equation:

$$V_0 = R \times (AT+B)$$

wherein R is a current-voltage converting ratio which corresponds to the resistance value of the resistor 32b.

The voltage obtained by the current-voltage converting circuit 32 is supplied to the offset adjusting circuit 33, and the level of the offset is adjusted by the offset adjusting circuit 33. The voltage V after the level of the offset is adjusted can be expressed by the following equation:

$$\begin{aligned}V &= V_0 - V_1 \\ &= RAT + (RB - V_1)\end{aligned}$$

wherein $V_1$ is a level of the offset setting voltage generated by the offset setting voltage source 33d.

Therefore, a temperature drift coefficient of the external modulating device 1 is multiplied by a product RA of the proportional constant A and the current-converting ratio R, and the offset setting voltage $V_1$ is suitably set. Thereby, the voltage source 27 with temperature compensation generates the initial bias setting voltage V corresponding the bias voltage which can control the operation point to be the optimum stable point in consideration of the shift the optimum stable point caused by the change of temperature.

Then, the initial bias setting voltage is applied to the bias voltage applying circuit 20, so that the bias voltage applying circuit outputs the bias voltage, which can control the operation point of the external modulating device 1 to the optimum stable point under the present temperature.

The switch control circuit 29 turns off the switch 23 in step ST11. Thereafter, the switch control circuit 29 is on standby for a predetermined period of time until the above-mentioned operation in which the initial bias setting voltage generated by the voltage source 27 with temperature compensation is used as a control voltage is stabilized (step ST12). Then, if the predetermined period of time is passed, the switch control circuit 29 turns on the switch 23 (step ST13).

Then, the control voltage outputted from the error amplifier 13 is applied to the bias voltage applying circuit 20. Thereby, the bias voltage is outputted to the bias voltage applying circuit 20 in accordance with the control voltage outputted from the error amplifier 13, and the following operation state is the same as the operation state of the first embodiment.

According to the above-mentioned structure, similar to the second embodiment, the bias voltage is set to the level close to the level, which can control the operation point to the optimum stable point by the initial bias setting voltage outputted by the voltage source 27 with temperature compensation. Thereafter, the level of the bias voltage can be slightly controlled such that the operation point can be controlled to the optimum stable point by the control voltage outputted by the error amplifier 13. Therefore, at the time of starting the power supply, the operation of the external modulating device 1 can be speedily and surely stabilized at the optimum stable point, and the continuous operation time can be prolonged.

Moreover, according to this embodiment, the level of the initial bias voltage is compensated in accordance with the change of temperature of the external modulating device 1. Due to this, the operation point can be controlled close to the optimum stable point by the bias voltage in accordance with the initial bias setting voltage.

For detecting the temperature of the external modulating device 1 by the voltage source with temperature compensation, there can be used the temperature detection device such as a thermistor in addition to the temperature detection IC 31.

Figure 11:
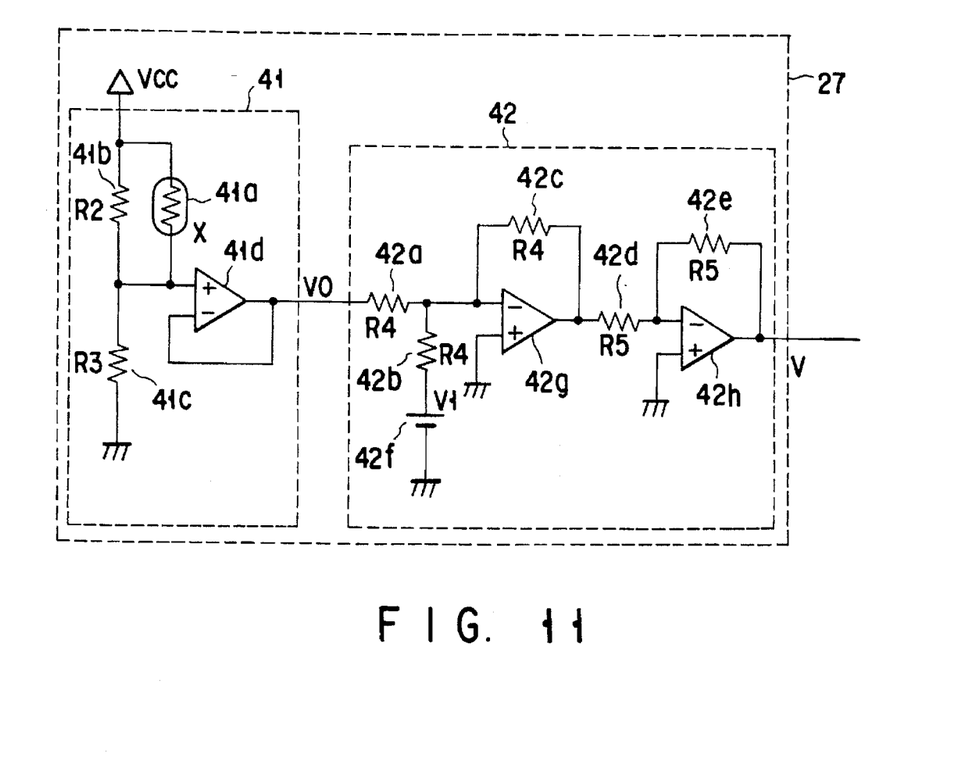
FIG. 11 is a circuit diagram showing an example of a modified structure of the voltage source with a temperature compensation in the external modulator of the third embodiment of the present invention.

FIG. 11 is a circuit diagram showing the structure of the voltage source 27 with temperature compensation in a case where the thermistor is used.

The voltage source 27 with temperature compensation comprises a temperature detection circuit 41 and an offset adjusting circuit 42.

The temperature detection circuit 41 comprises a thermistor 41a, resistors 41b, 41c, and an operational amplifier 41d. The offset adjusting circuit 42 comprises resistors 42a, 42b, 42c, 42d, 42e, an offset setting voltage source 42f, and operational amplifiers 42g, and 42h.

The voltage $V_0$ outputted from the operational amplifier 41d of the temperature detection circuit 41 can be expressed by the following equation if the resistance values of the thermistor 41a, the resistors 41b, and 41c are X, $R_2$, and $R_3$, respectively:

$$V_0 = \frac{R_3}{R_3 + \frac{R_2}{1 + R_2/x}} V$$

Therefore, $V_0$ can be expressed by the following equation if X is high:

$$V_0 = \frac{R_3}{R_3 + R_2} V$$

Also, $V_0$ can be expressed by the following equation if X is low:

$$V_0 = \frac{R_3}{R_3 + X} V \sim V$$

On the other hand, resistance value X of the thermistor 41a can be expressed by the following equation:

$$X = X_0 \exp\left[B\left(\frac{1}{T} - \frac{1}{T_0}\right)\right]$$

wherein $X_0$ is a resistance value of the thermistor 41a in a case where $T=T_0$, B is a B coefficient, and T and $T_0$ are temperature (T is a variable).

The voltage obtained by the temperature detection circuit 41 is applied to the offset adjusting circuit 42, and the level of the offset is adjusted by the offset adjusting circuit 42. The voltage V after the level of the offset is adjusted by the offset adjusting circuit 42 can be expressed by the following equation:

$$V = V_0 - V_1$$

wherein $V_1$ is a level of the offset setting voltage which is generated by the offset setting voltage source 42f.

Therefore, the respective resistance values and the offset setting voltage $V_1$ is suitably set. Thereby, the voltage source 27 with temperature compensation generates the initial bias setting voltage V corresponding the bias voltage which can control the operation point to be the optimum stable point in consideration of the shift the optimum stable point caused by the change of temperature. In this case, the voltage change ratio can be determined by selecting $R_2$ and $R_3$.

(Fourth embodiment)

The following will explain a fourth embodiment of the present invention.

Figure 12:
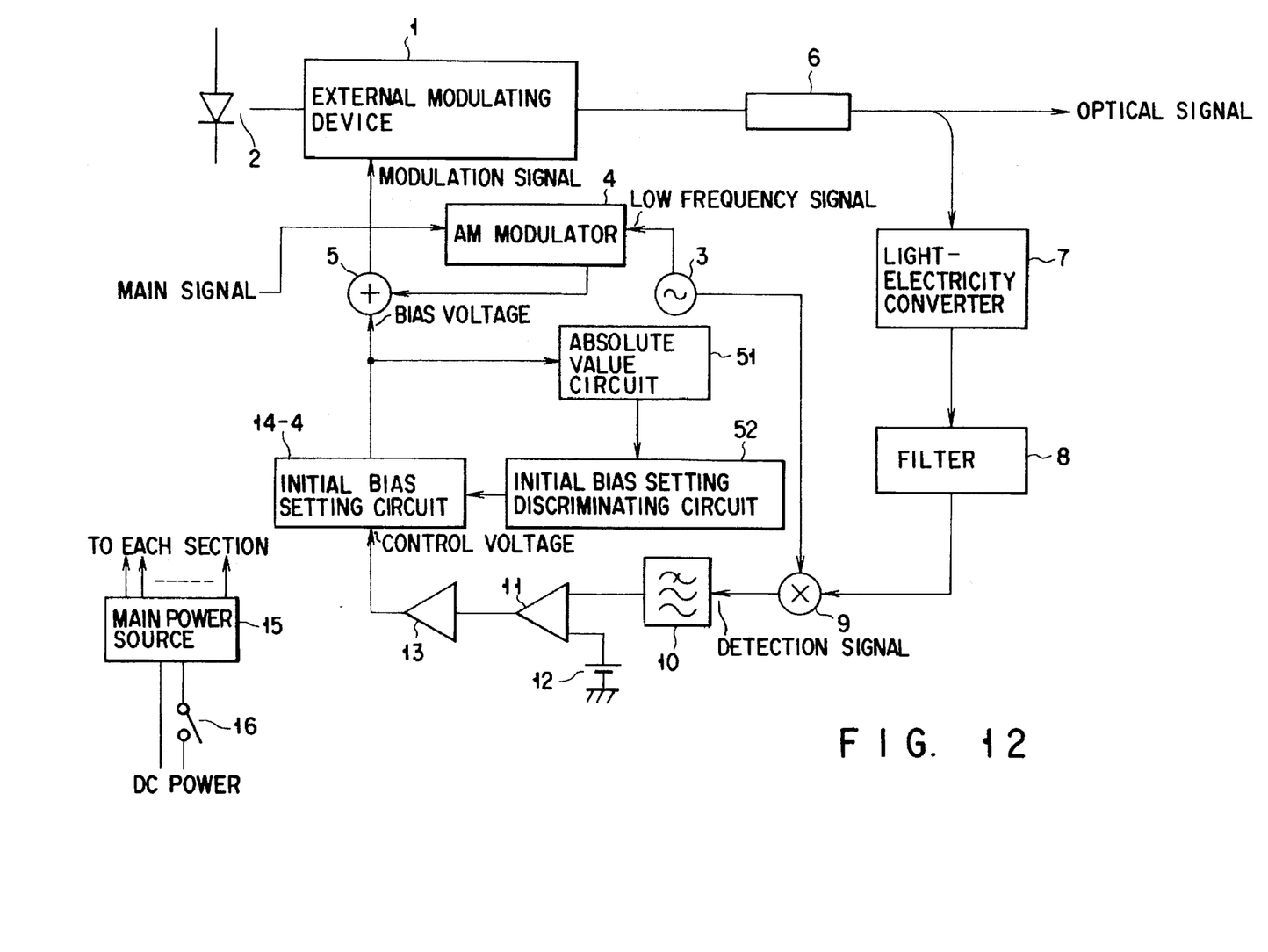
FIG. 12 is a view showing a schematic structure of an external modulator of a fourth embodiments of the present invention.

FIG. 12 is a view showing the structure of the external modulator of this embodiment. In this case, the same reference numerals are added to the portions common to FIG. 4, and the detailed explanation will be omitted.

As shown in the figure, the external modulator of this embodiment comprises the external modulating device 1, the light source 2, the low frequency signal generator 3, the AM modulator 4, the adder 5, the optical branching device 6, the light-electricity converter 7, the filter 8, the multiplier 9, the low-pass filter 10, the comparator 11, the reference voltage source 12, the error amplifier 13, the initial amplifier 13, an initial bias setting circuit 14-4, the main power supply 15, the power switch 16, an absolute value circuit 51, and an initial bias setting discriminating circuit 52.

Figure 13:
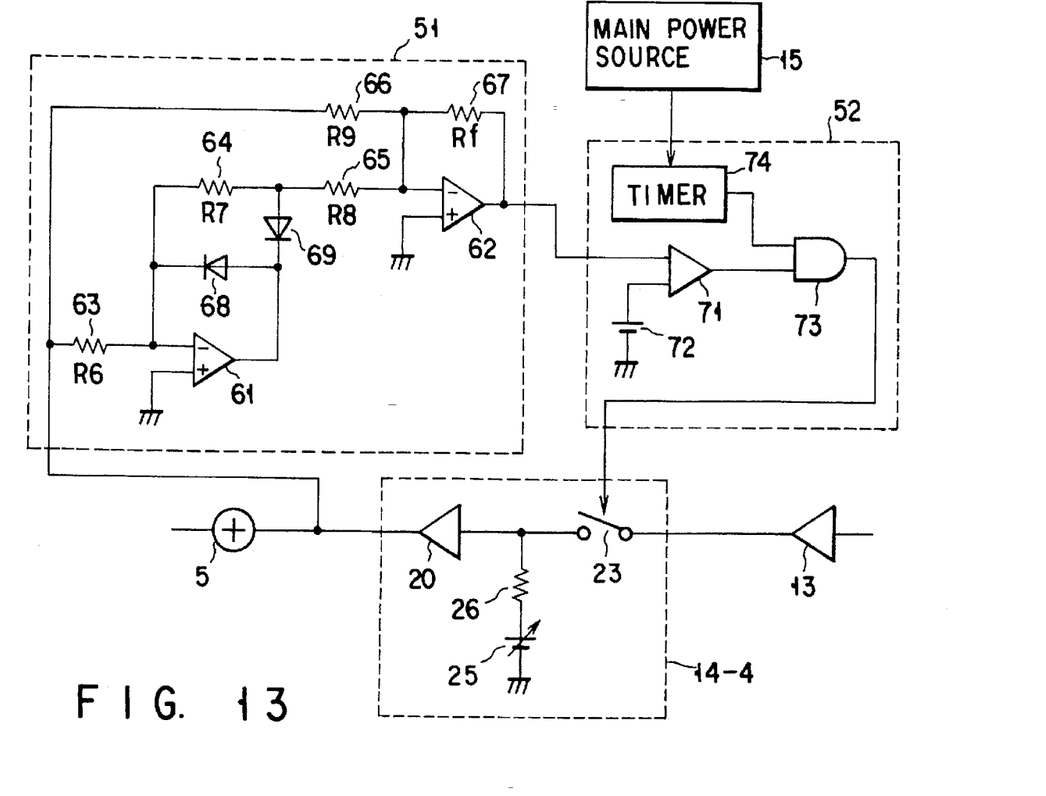
FIG. 13 is a view showing a specific structure of each of an initial bias setting circuit, an absolute value setting circuit, and an initial bias setting discriminating circuit of the external modulator of the fourth embodiment of the present invention.

The external modulator of this embodiment has basically the same structure as that of the first to the third embodiments. However, the external modulator of the this embodiment is different from the that of the first to third embodiments in the structure of the initial setting circuit 14-4. Also, the external modulator of the this embodiment is characterized in the point that the absolute value circuit 51, and the initial bias setting discriminating circuit 52 are provided, FIG. 13 is a view showing the structure of each of the initial bias setting circuit 14-4, the absolute value circuit 51, and the initial bias setting discriminating circuit 52. In this case, the same reference numerals are added to the portions common to FIG. 6, and the detailed explanation is omitted.

The initial bias setting circuit 14-4 comprises the bias voltage applying circuit 20, the switch 23, the initial bias setting voltage source 25, and the resistor 26. In other words, the structure of the initial bias setting circuit 14-4, the switching control circuit 24 is removed from the initial bias setting circuit of the second embodiment.

The absolute value circuit 51 comprises operational amplifiers 61, 62, resistors 63, 64, 65, 66, 67, and diodes 68 and 69. Only in a case where the polarity of the bias voltage outputted from the bias voltage applying circuit 20 is positive, a circuit for reversely amplifying the output of the bias voltage applying circuit 20 is structured by the operational amplifier 61, the resistors 63, 64, and diodes 68 and 69. Also, by use of the operational amplifier 62, and the resistors 65, 66, and 67, there is structured a circuit for reversely amplifying under a condition that the output of the operational amplifier 61 and that of the bias voltage applying circuit 20 are added at a rate, which is fixed by a ratio of the resistance values of the resistors 65 and 66.

The initial bias setting discriminating circuit 52 comprises a comparator 71, a reference voltage source 72, an AND gate 73, and a timer 74. The comparator 71 compares the detection voltage provided from the absolute value circuit 51 with a predetermined reference voltage generated by the reference voltage source 72. Then, when the reference voltage exceeds the detection voltage, an output having an "H" level is outputted. The AND gate 73 is opened/closed by the output of the timer 74. When the output of the timer 74 is in an "H" level, the output of the comparator 71 is supplied to the switch 23 of the initial bias setting circuit 14. The switch 23 is opened when the output of the AND gate 73 is in an "H" level. The timer 74 is started by the power supply, and counts a predetermined time. Then, the timer 74 outputs an "H" level when counting time.

An operation of the above-structured external modulator will be explained as follows.

First, regarding the operation of the intensity-modulation of the optical signal by use of the external modulating device 1, and the control operation of the bias voltage, these operations are performed in the same manner as the external modulator of the first embodiment. However, in this embodiment, the following characteristic operation is performed at the time of the power supply.

First, when the power switch 16 is turned on, the DC power is supplied to the main power source 15. Thereby, the main power source 15 starts the power supply to each section of the external modulator to start each section.

When the power supply from the main power source 15 is started and the operation of the timer 74 starts counting time. The timer 74 outputs the "H" level until a predetermined time is counted. Thereby, the AND gate 73 is set to be in a state that the output of the comparator 71 is supplied to the switch 23 of the initial bias setting circuit 14 for a predetermined period of time.

On the other hand, in the absolute value circuit 51, the absolute value of the bias voltage outputted from the bias voltage applying circuit 20, that is, the amount of shift of the bias voltage from the ground level is detected as follows.

More specifically, a case in which the polarity of the bias voltage is positive is considered. In this case, the diode 68 is not conductive, and the diode 69 is conductive, so that a loop is formed. Thereby, the operational amplifier 61 and the resistors 63 and 64 are operated as a reverse amplifier, and the output of the bias applying circuit 20 is reversely amplified. The output of the operational amplifier 61 is added to the output of the bias voltage applying circuit 20 at a rate which is fixed by a ratio of the resistors 65 and 66. Then, the obtained output are reversely amplified by the operational amplifier 62 and the resistors 65, 66, and 67, and outputted as a detection voltage.

Next, a case in which the polarity of the bias voltage is negative is considered. In this case, the diode 68 is not conductive, and an output terminal of the operational amplifier 61 and a reverse input terminal are shorted. Thereby, the operational amplifier 61 and the resistors 63 and 64 do not function as a reverse amplifier. In this case, only the output of the bias voltage applying circuit 20 is reversely amplified by the operational amplifier 62 and the resistors 66 and 67, and outputted as a detection voltage.

If the resistance values of the resistors 63, 64, 65, and 66 are $R_6$, $R_7$, $R_8$, and $R_9$, respectively, each resistance value is set to satisfy the following relationship.

$$\frac{R_7}{R_6} = \frac{R_9}{2R_8}$$

Figure 14:
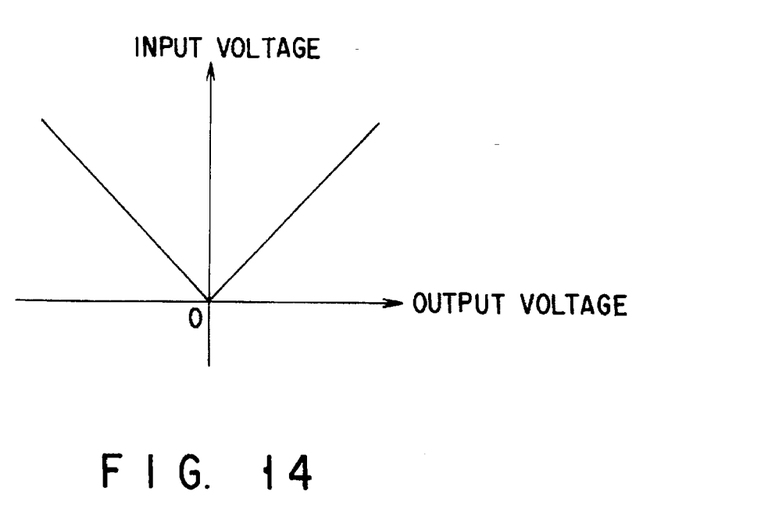
FIG. 14 is a view showing a relationship between an input voltage of the absolute value setting circuit and an output voltage thereof in the external modulator of the fourth embodiment of the present invention.

Due to this, the relationship between an input voltage (bias voltage) of the absolute value circuit 51 and an output voltage (output voltage of the operational amplifier 62) is shown in FIG. 14, and the output voltage becomes a level in accordance with the absolute value of the bias voltage. In the operational amplifier 62, a gain is fixed by a resistance value $R_f$ of the resistor 67.

The comparator 71 of the initial bias setting discriminating circuit 52 compares the detection voltage outputted from the absolute value circuit 51 with a predetermined voltage generated by the reference voltage source 72. By use of the absolute value circuit 51, the comparator 71, and the reference voltage source 72, it is checked whether or not the level of the bias voltage is in a predetermined range close to the ground level. Then, when the level of the bias voltage is out of the predetermined range, the output of the comparator is set in an "H" level.

As mentioned above, if the level of the bias voltage is out of the predetermined range close to the ground level, the output whose level is "H" is provided from the AND gate 73 to the switch 23. Thereby, the switch 23 is set to be in an off state, and the initial bias setting voltage generated by the initial bias setting voltage source 25 is applied to the input terminal of the bias voltage applying circuit 20. As a result, similar to the second embodiment, the bias voltage is set to be in the level by which the operation point is controlled to the optimum stable point in a case where the external modulator of this embodiment is in the standard state.

If the level of the bias voltage is in the predetermined range close to the ground level by the control voltage outputted by the error amplifier 13 at the time of starting the power supply, the switch 23 is maintained in the on state since the output whose level is "H" is not outputted from the comparator 71 and the AND gate 73. Therefore, the control of the bias voltage is immediately performed to control the operation point to be the operation stable point by the control voltage outputted by the error amplifier 13. At this time, since the level of the bias voltage is in the predetermined range close to the ground level in the initial state, the bias voltage is adjusted to control the operation point to be the optimum stable point.

According to the above-mentioned embodiment, at the time of starting the power supply, the operation of the external modulation device 1 is surely stabilized at the optimum stable point, and the continuous operation time can be prolonged.

Moreover, according to the above-mentioned embodiment, if the level of the bias voltage is in the predetermined range close to the ground level at the time of starting the power supply, and the bias voltage can be adjusted so that the operation point can be controlled to be the optimum stable point by the control voltage outputted by the error amplifier 13, the control of the bias voltage is directly performed by the control voltage outputted by the error amplifier 13 without using the initial bias setting voltage source 25. Thereby, the initial setting operation using the initial bias setting voltage source 25 can be omitted, so that time till the operation of the external modulating device 1 is stabilized at the optimum stable point can be shortened.

The present invention is not limited to the above-mentioned embodiments.

For example, the switch control circuit 24 of the second and third embodiments may be structured in which an analog timer using a time constant by a CR circuit or a digital timer using a counter is provided and the switch 23 is opened only for a predetermined period of time after the power supply is started.

Also, the initial bias setting discriminating circuit 52 of the fourth embodiment may be formed of the microprocessor serving as a main control circuit.

Moreover, even in the external modulator of the fourth embodiment, the temperature compensation circuit as in the external modulator of the third embodiment may be provided in the initial bias setting circuit 14.

Furthermore, the present invention can be variously modified within the range without deviating from the gist of the present invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An external modulator comprising:
   an external modulating device of an interference type;
   low frequency signal generating means for generating a predetermined low frequency signal;
   bias generating means for generating a bias voltage and capable of changing the level of the bias voltage within a predetermined range centered on a ground level;
   superimposing means for amplitude-modulating a main signal by said low frequency signal, and superimposing said bias signal thereon to obtain a signal serving as a modulation signal to be supplied to said external modulating device of the interference type;
   low frequency signal extracting means for extracting a component corresponding to said low frequency signal from an output light of said external modulating device of the interference type;
   bias controlling means for controlling a voltage level of said bias voltage based on the low frequency signal extracted by said low frequency signal extracting means so that the operation point of the external modulating device of an interference type is set at a predetermined operation stable point; and
   initial setting means for initially setting the level of the bias voltage so that the operation point of the external modulating device of an interference type is set to the operation stable point nearest the operation point attained when the bias voltage of the ground level is applied.

2. The external modulator according to claim 1, wherein said external modulating device comprises a substrate of LiNbO$_3$.

3. The external modulator according to claim 1, wherein said low frequency signal generating means is a crystal oscillator.

4. The external modulator according to claim 1, wherein said bias generating means is an operational amplifier.

5. The external modulator according to claim 1, wherein said bias generating means is used to generate the bias voltage whose level corresponds to a control voltage provided by said bias generating means, and said initial setting means is an integrating circuit inserted to an input terminal of said control voltage of said bias generating means.

6. The external modulator according to claim 1, wherein said bias generating means is used to generate a bias voltage whose level corresponds to a control voltage provided to an input terminal of said control voltage, and said initial setting means comprises power supply means for providing the control voltage, corresponding to the bias voltage of a predetermined voltage level, to said input terminal of said control voltage, switching means for switching on/off the supply of the control voltage provided by said bias controlling means to said input terminal of said control voltage, and switch controlling means for controlling said switching means so as to switch off the supply of the control voltage provided by said bias controlling means to said input terminal of said control voltage for a predetermined period of time when the power supply is started.

7. The external modulator according to claim 6, wherein said initial setting means comprises temperature compensating means for controlling the voltage level of the control voltage generated by said power source means based on an ambient temperature.

8. An external modulator comprising:
   an external modulating device of an interference type;
   low frequency signal generating means for generating a predetermined low frequency signal;
   bias generating means for generating a bias voltage and capable of changing the level of the bias voltage within a predetermined range centered on a ground level;
   superimposing means for amplitude-modulating a main signal by said low frequency signal, and superimposing said bias signal thereon to obtain a signal serving as a modulation signal to be supplied to said external modulating device;
   low frequency signal extracting means for extracting a component corresponding to said low frequency signal from an output light of said external modulating device;
   bias controlling means for controlling a voltage level of said bias voltage based on the low frequency signal extracted by said low frequency signal extracting means so that the operation point of the external modulating device interference type is set to a predetermined operation stable point;
   initial setting means for initially setting the level of the bias voltage so that the operation point of the external modulating device is set to an operation stable point nearest the operation point attained when a bias voltage of ground level is applied;
   discriminating means for discriminating whether or not said bias voltage is in a predetermined allowable range; and
   initial setting controlling means for setting the level of said bias voltage by said initial setting means only when it is discriminated that said bias voltage is not in the predetermined allowable range by said discriminating means for a predetermined period of time after the power supply is started.

9. The external modulator according to claim 8, wherein said external modulating device comprises a substrate of LiNbO$_3$.

10. The external modulator according to claim 8, wherein said low frequency signal generating means is a crystal oscillator.

11. The external modulator according to claim 8, wherein said bias generating means is an operational amplifier.

12. A method for externally modulating light using an external modulating device of an interference type, comprising the steps of:

generating a predetermined low frequency signal;

generating a bias voltage whose level is within a predetermined range centered on a ground level;

amplitude-modulating a main signal by said low frequency signal, and superimposing said bias signal thereon to obtain a signal serving as a modulation signal to be supplied to said external modulating device;

extracting a component corresponding to said low frequency signal from an output light of said external modulating device;

controlling a voltage level of said bias voltage based on the low frequency signal extracted in said extracting step so that an operation point of the external modulating device is set to a predetermined operation stable point; and initially setting the level of the bias voltage so that the operation point of the external modulating device is set to an operation stable point nearest the operation point attained when a bias voltage of the ground level is applied.

* * * * *